(12) United States Patent
Inagaki et al.

(10) Patent No.: US 7,754,358 B2
(45) Date of Patent: Jul. 13, 2010

(54) FUEL CELL COMPONENT HAVING A RETRIEVAL CODE

(75) Inventors: Toshiyuki Inagaki, Toyota (JP); Tsuyoshi Takahashi, Nishikamo (JP); Haruhisa Niimi, Tokai (JP); Mikio Wada, Nishikamo (JP); Toshiyuki Suzuki, Toyota (JP); Yixin Zeng, Kariya (JP); Kouetsu Hibino, Nisshin (JP); Tsutomu Ochi, Toyota (JP); Yasuyuki Asai, Toyota (JP); Katsuhiro Kajio, Anjo (JP); Yuichi Yagami, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1177 days.

(21) Appl. No.: 10/485,471

(22) PCT Filed: Jul. 31, 2002

(86) PCT No.: PCT/IB02/02962
§ 371 (c)(1), (2), (4) Date: Jul. 19, 2004

(87) PCT Pub. No.: WO03/012902
PCT Pub. Date: Feb. 13, 2003

(65) Prior Publication Data
US 2004/0247951 A1 Dec. 9, 2004

(30) Foreign Application Priority Data
Aug. 1, 2001 (JP) ............................. 2001-233250
Jul. 19, 2002 (JP) ................................. 02211374

(51) Int. Cl.
*H01M 8/00* (2006.01)
*H01M 8/10* (2006.01)
(52) U.S. Cl. .......................................... 429/12; 429/30
(58) Field of Classification Search .................. 429/12, 429/30
See application file for complete search history.

(56) References Cited

U.S. PATENT DOCUMENTS
2,123,956 A 2/1937 Olson ............................ 40/25
(Continued)

FOREIGN PATENT DOCUMENTS
JP 08-037012 2/1996
(Continued)

OTHER PUBLICATIONS

Canadian Office Action, Appln. No. 2,455,484, issued on Jul. 4, 2007.
Japanese Version of Japanese Official Action (Appln. No. 2002-211374) issued Oct. 25, 2005.
Partial English Translation of the Japanese Official Action (Appln. No. 2002-211374) issued Oct. 25, 2005.

*Primary Examiner*—Patrick Ryan
*Assistant Examiner*—Karie O'Neill Apicella
(74) *Attorney, Agent, or Firm*—Kenyon & Kenyon LLP (57) ABSTRACT

A fuel cell (10) includes a lamination (11) of a plurality of unit cells (30), current collector plates (12, 12) arranged at both ends of the lamination (11), end plates 16, 16 respectively provided outside the current collector plates (12, 12) with 5 insulating plates (14, 14) interposed therebetween, and fastening members (18) for fastening the end plates (16, 16) in the laminating direction to apply desired pressing force to the lamination (11). A barcode (41) corresponding to particular information relating to a unit cell (30) is provided on the exposed side surface of a separator (38) of the unit cell (30). According to this fuel cell (10), the barcode 41 can be easily read requiring no disassembly of the fuel cell (10). Moreover, as the information relating to the fuel cell can be obtained from the barcode (41), the information that cannot be determined from outer appearance can be obtained, resulting in improved service operations.

13 Claims, 7 Drawing Sheets

U.S. PATENT DOCUMENTS

| | | | |
|---|---|---|---|
| 4,198,597 A * | 4/1980 | Sawyer | 324/434 |
| 5,912,934 A | 6/1999 | Acks et al. | 376/248 |
| 6,315,801 B1 * | 11/2001 | Miyazaki et al. | 29/623.5 |
| 6,828,055 B2 * | 12/2004 | Kearl | 429/38 |

FOREIGN PATENT DOCUMENTS

| | | | |
|---|---|---|---|
| JP | 08037012 | | 2/1996 |
| JP | 09-092324 | | 4/1997 |
| JP | 10-066266 | | 3/1998 |
| JP | 10066266 A | * | 3/1998 |
| JP | 11-258013 | | 9/1999 |
| JP | 2001/057711 | | 2/2001 |
| JP | 2001-210346 A2 | | 8/2001 |
| JP | 2002161997 A | * | 6/2002 |
| WO | WO 99/18627 | | 4/1999 |

* cited by examiner

FUEL CELL COMPONENT HAVING A RETRIEVAL CODE

This is a 371 of PCT/IB02/02962 filed 31 Jul. 2002, which claims priority to JP 2001-233250 filed 1 Aug. 2001, and JP-2002-211374 filed 19 Jul. 2002, the contents of which are incorporated herein by reference.

BACKGROUND OF THE INVENTION

1. Field of the Invention

The invention relates to a fuel cell component that constitutes a fuel cell.

2. Description of Related Art

A generally known fuel cell is formed by laminating a plurality of unit cells which are interposed between end plates, and fastening the end plates to the unit cells using a fastening member. This type of the fuel cell is designed to generate a desired output voltage by connecting the plurality of unit cells in series.

Upon failure of one of the unit cells of the fuel cell, that is, degradation in power generation capability and the like, for example, the defective unit cell is replaced with a new one by loosening the fastening members so as to disassemble the end plates from the unit cells. After the replacement, the unit cells are fastened to the end plates again as disclosed in JP-A-8-37012.

In the case where the defective unit cell is replaced by the new one, the particular information relating to the new unit cell such as manufacturing data cannot be obtained from the outer appearance. It is thus difficult to determine whether the newly replaced unit cell functions appropriately.

SUMMARY OF THE INVENTION

It is an object of the invention to provide a fuel cell component capable of obtaining information that cannot be determined by its outer appearance.

A fuel cell component of a fuel cell includes a retrieval code or a specific information identifying element or a specific information identifier that is correlated to particular information relating to the fuel cell. The retrieval code (or the specific information identifying element or the specific information identifier) is provided on an exposed surface of the fuel cell component so as to be accessible from outside of the fuel cell component.

On the basis of the retrieval code that can be read from the exposed surface, the information related to the unit cell can be retrieved with no need of disassembling the fuel cell component. The retrieval code is related to various data related to the fuel cell, providing the information of the fuel cell that cannot be determined by the outer appearance. This makes it possible to simplify service operation. The term "particular information relating to the unit cell" herein represents the information relating to the fuel cell itself and parts constituting the fuel cell. The "particular information" used herein includes various data, for example, output characteristics, record of past usage, manufacturing data, record of chronological change in behavior or the like.

The retrieval code may be at least one of an optically readable code, a magnetically readable code, an electrically readable code, and a mechanically readable code. This makes it possible to easily read the retrieval codes. The optically readable code includes a barcode, and a combination of concave and convex portions that forms a code pattern. The magnetically readable code includes a code stored on a magnetic tape and the like. The electrically readable code includes a code stored on an IC (Integrated Circuit) chip and the like. The mechanically readable code includes concave and convex portions that constitute a code pattern.

The fuel cell component includes a unit cell formed by interposing a solid electrolyte membrane between separators via an electrode. The information relating to the fuel cell contains data relating to the unit cell. The information related to the fuel cell may contain the information of each of the unit cells such that the information that cannot be determined by the outer appearance can be retrieved. The retrieval code may be provided on one of the separators of the unit cell. Since the separator generally has a plate-like shape with a certain thickness, the retrieval code can be easily provided. The retrieval code may be provided on an exposed region of a side surface of the separator. The term "information relating to the unit cell" herein represents the information of the unit cell itself or elements constituting the unit cell.

The fuel cell component includes a cell lamination formed by laminating a plurality of the unit cells each including a solid electrolyte membrane interposed between separators via an electrode. The information relating to the fuel cell contains data relating to the cell lamination. This makes it possible to retrieve the information relating to the cell lamination that cannot be determined by the outer appearance. The retrieval code may be provided on at least one portion of the cell lamination. The retrieval code can be easily provided on the cell lamination having a three-dimensional shape. The term "cell lamination" may refer to a cell stack formed by laminating a plurality of unit cells that is interposed between end plates and fastening the unit cells with the end plates using a fastening member. Alternatively the "cell lamination" may refer to a cell module as a part of the cell stack. Since the cell lamination has a three-dimensional shape, the retrieval code can be easily provided. Note that the "cell lamination" represents a cell stack (having a lamination of a plurality of unit cells with each of the end plates arranged on top and bottom of the laminated body, respectively, and fastened by fastening members. Alternatively the cell lamination may be formed as a part of the laminated body employed for producing the cell stack, that is, a cell module. The term "information relating to the cell lamination" may refer to the information relating to the cell lamination itself or parts constituting the cell lamination.

A fuel cell component of a fuel includes a data storage medium that stores particular information relating to the fuel cell. The data storage medium is provided on an exposed surface of the fuel cell component so as to be accessible from outside of the fuel cell component.

The storage medium of the fuel cell component is accessible from the outer exposed surface so as to read the information relating to the fuel cell stored in the recording medium. The information can be read by accessing the recording medium from the outer exposed surface with no need of disassembling the fuel cell component. The information that cannot be determined by the outer appearance can be located, improving the service operation.

The data storage medium allows at least one of update and addition of the information. This makes it possible to have update and addition of the information that changes with time, for example, chronological record of the output characteristics, past usage, functional behavior or the like. As a result, the service operation can be further simplified.

The fuel cell component includes a unit cell formed by interposing a solid electrolyte membrane between separators via an electrode. The information relating to the fuel cell contains data relating to the unit cell. This makes it possible to obtain the information relating to each of the unit cells that cannot be determined from the outer appearance. The data storage medium is provided on one of the separators of the unit cell. The storage medium can be easily provided on the separator having a plate-like shape with a certain thickness. An electrode for accessing the storage medium may be provided on an exposed area of a side surface of the separator, and the storage medium may be embedded in the separator.

The fuel cell includes a cell lamination formed by laminating a plurality of the unit cells each including a solid electrolyte membrane interposed between separators via an electrode. The information relating to the fuel cell contains data relating to the cell lamination. This makes it possible to obtain the information relating to the cell lamination that cannot be determined from the outer appearance. The data storage medium is provided on at least one portion of the cell lamination. The storage medium can be easily provided on the cell lamination having a three-dimensional shape.

The particular information contains at least one of output characteristics, charging/discharging characteristics, past usage record, manufacturing record, maintenance record, and chronological change in behavior. This makes it possible to specify various information including the output characteristics, charging/discharging characteristics, record of the past usage, manufacturing data (material, conditions for manufacturing), maintenance or functional behavior which may improve or deteriorate the fuel cell performance.

DETAILED DESCRIPTION

First Embodiment

Figure 1:
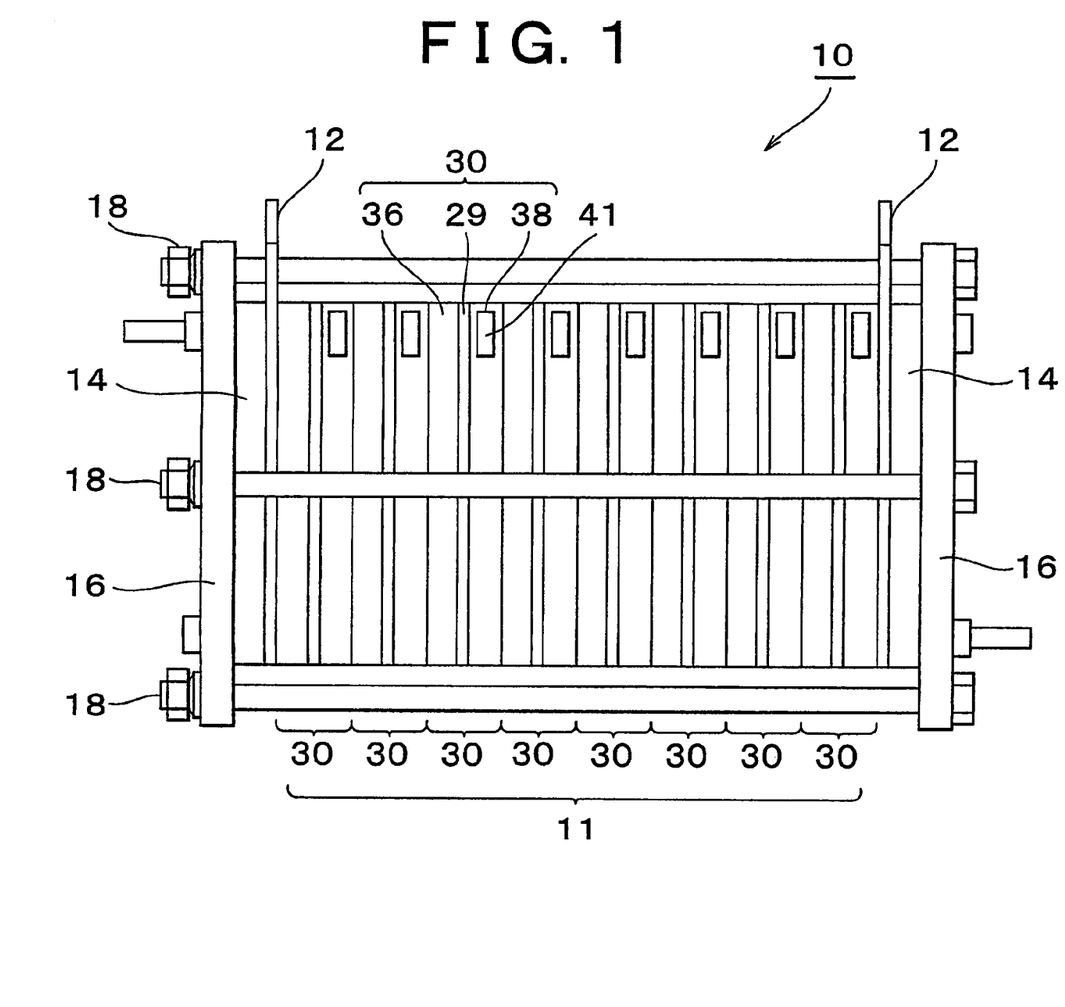
FIG. 1 is a side view showing the outward appearance of a fuel cell according to a first embodiment.
Figure 2:
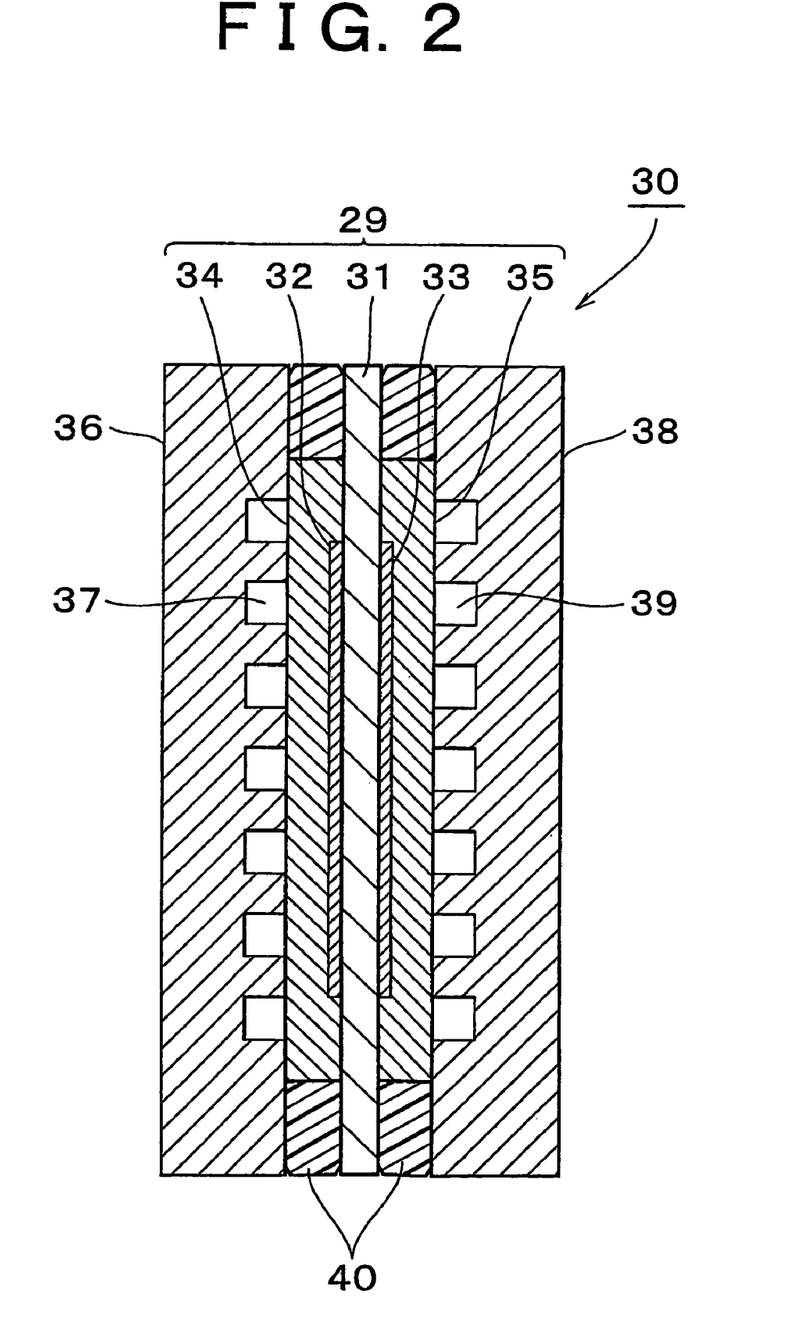
FIG. 2 is a cross-sectional view showing the inner structure of a unit cell according to the first embodiment.
Figure 3:
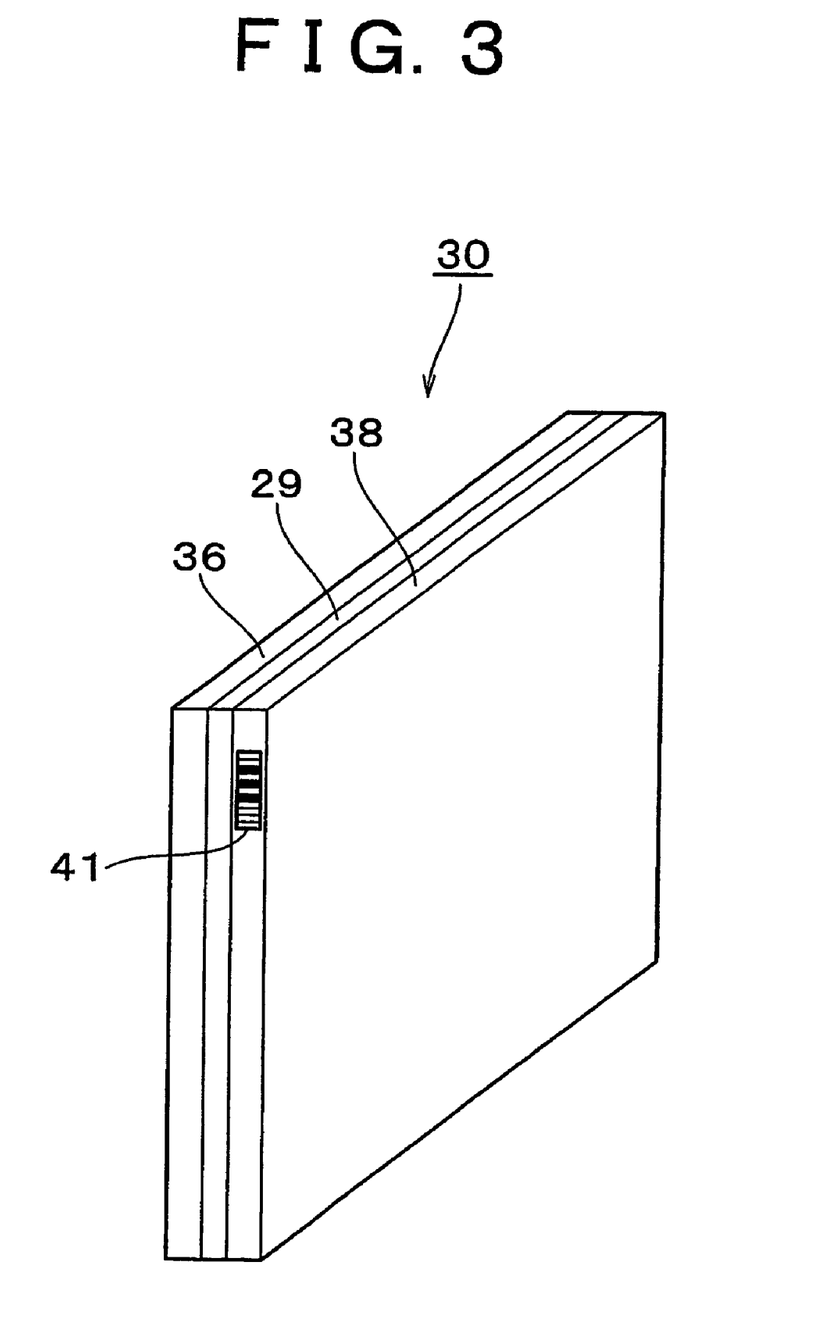
FIG. 3 is a perspective view showing the outward appearance of a unit cell according to the first embodiment.
Figure 4:
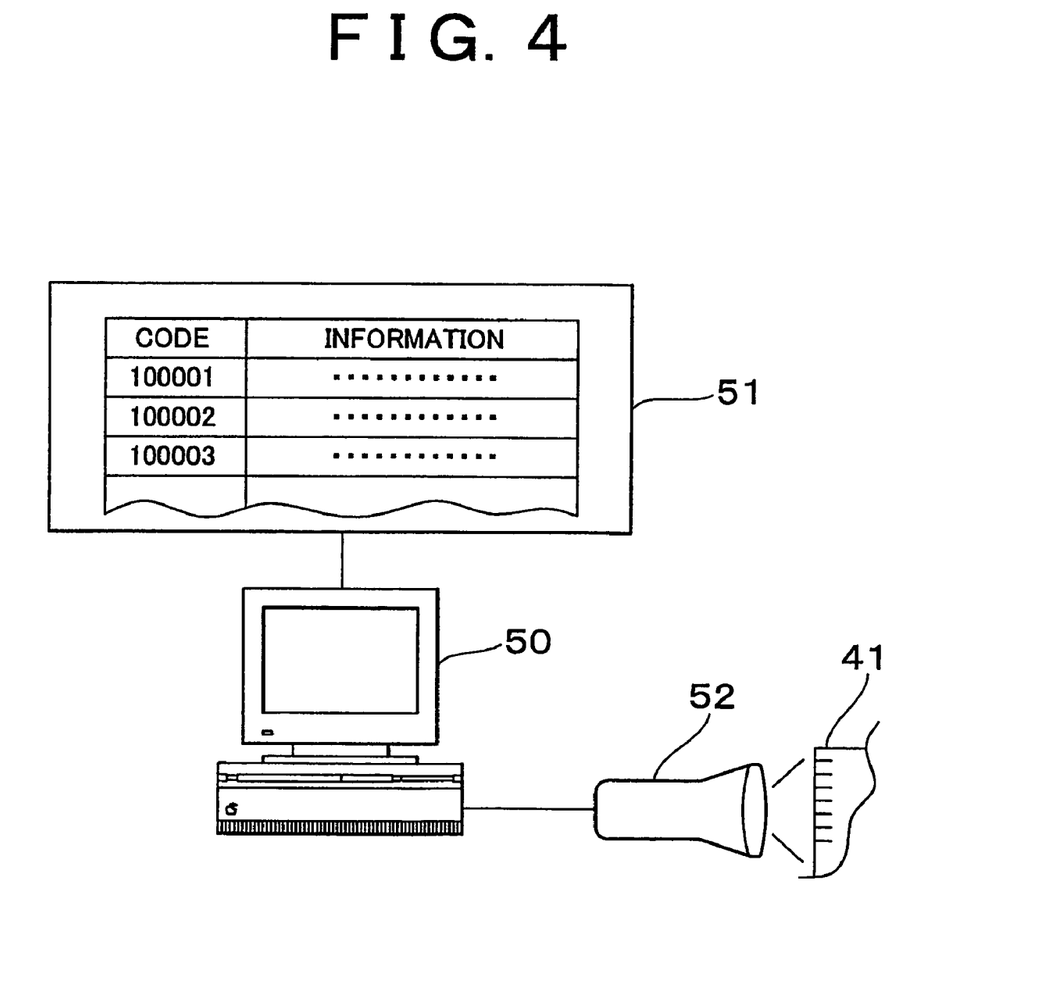
FIG. 4 schematically shows the structure of a system for reading particular information relating to a unit cell from a barcode according to the first embodiment.

FIG. 1 is a schematic side view showing the outward appearance of a fuel cell according to the first embodiment. FIG. 2 is a cross-sectional view showing the inner structure of a unit cell. FIG. 3 is a schematic perspective view showing the outward appearance of a unit cell. FIG. 4 schematically shows the structure of a system for reading information relating to a unit cell from a barcode.

As shown in FIG. 1, a fuel cell 10 includes a cell lamination 11 formed of a plurality of laminated unit cells 30, current collector plates 12, 12 arranged at both ends of the cell lamination 11, end plates 16, 16 arranged at both ends of the current collector plates 12, 12 with insulating plates 14, 14 interposed therebetween, and fastening members 18 for fastening the end plates 16, 16 in the laminating direction to apply a desired pressing force to the cell lamination 11.

Referring to FIG. 2, each unit cell 30 of the fuel cell 10 is formed by interposing a membrane electrode assembly (MEA) 29 between two separators 36 and 38. The MEA 29 is formed by interposing a solid electrolyte membrane 31 between gas diffusion electrodes 34 and 35. The solid electrolyte membrane 31 functions as a proton-conducting electrolyte in a wet condition. A perfluoro sulfonic acid resin membrane like Nafion membrane produced by Du Pont may be employed as the solid electrolyte membrane 31. Each of the gas diffusion electrodes 34, 35 is formed from a carbon cloth, a woven material of carbon fiber threads, and have a length slightly shorter than that of the solid electrolyte membrane 31. Catalyst electrodes 32, 33 are respectively embedded on the surfaces of the gas diffusion electrodes 34, 35 that face the solid electrolyte membrane 31. The catalyst electrodes 32, 33 are formed from carbon powder carrying platinum, an alloy of platinum and another metal, or the like as a catalyst. Each of the separators 36, 38 has a substantially rectangular shape, and is formed from gas-impermeable, dense carbon, i.e., carbon compressed to have a gas impermeable property. The separators 36, 38 serve as partitions of the unit cell 30. A fuel gas passage 37 is formed in the surface of the separator 36 that faces the gas diffusion electrode 34. An oxidizing gas passage 39 is formed in the surface of the separator 38 that faces the gas diffusion electrode 35. As shown in FIG. 3, a barcode 41 is provided on the exposed side surface of the separator 38. Gaps defined by the separators 36, 38 and the MEA 29 having no gas diffusion electrodes 34, 35 are filled with a sealant 40 so as to prevent leakage of fuel gas and oxidizing gas, and mixture of those gases in the gaps.

The gas diffusion electrode 34 is a fuel electrode to which fuel gas, that is, hydrogen or a high-concentration, hydrogen-containing gas is supplied from the fuel gas passage 37. At the gas diffusion electrode 34, protons ($H^+$) and electrons (e) are produced from hydrogen molecules ($H_2$). On the other hand, the gas diffusion electrode 35 is an air electrode to which oxidizing gas, that is, air is supplied from the oxidizing gas passage 39. At the gas diffusion electrode 35, water ($H_2O$) is produced from the reaction of oxygen molecules ($O_2$), protons ($H^+$) and electrons (e). The protons produced at the gas diffusion electrode 34 travel to the gas diffusion electrode through the solid electrolyte membrane 31. The electrons produced at the gas diffusion electrode 34 travel to the gas diffusion electrode 35 through a not-shown external path. The gas diffusion electrode 34 has an increased Fermi level as a result of receiving the electrons from the hydrogen molecules. Meanwhile the gas diffusion electrode 35 has a reduced Fermi level as a result of giving the electrons to the oxygen molecules. Such a Fermi level difference between the electrodes 34, 35 causes electromotive force. Each unit cell 30 has electromotive force of about 1 volt. Therefore, a plurality of unit cells 30 are connected in series with each other to form the fuel cell 10 that generates desired voltage.

Each code number contained in the barcode 41 is correlated to the information related to the unit cell 30. More specifically, as shown in FIG. 4, an internal memory 51 of a database computer 50 stores a database where code numbers of the barcodes 41 are correlated to the information relating to the unit cells 30. The barcode 41 is optically read with a barcode reader 52 connected to the database computer 50, and the database computer 50 then extracts the information related to the code number of the barcode 41 for display. The information relating to the unit cell 30 includes invariable information that requires no updating such as initial output characteristics, initial charging/discharging characteristics of the fuel cell 30, materials and manufacturing conditions of the solid electrolyte membrane 31 and the gas diffusion electrodes 34, 35 of the MEA 29, product name, manufacturer, date of manufacture, material and manufacturing conditions of the separators 36, 38, and shape of the gas passages. The information may further include maintenance information such as record of the past repairs.

Hereinafter, an example of manufacturing the fuel cell 10 according to the embodiment will be described. In the manufacturing process of the fuel cell 10, a cell lamination 11 is formed by laminating a plurality of unit cells 30. In this step, unit cells 30 having the same or similar information are selected and used to form the cell lamination 11. The cell lamination 11 may be formed from the unit cells 30 having the same or similar output characteristics and charging/discharging characteristics, or having components such as solid electrolyte membrane 31 and gas diffusion electrodes 34, 35 made of the same or similar material with the same or similar manufacturing conditions. This ensures that the resultant fuel cell 10 is formed from the fuel cells 30 having the same or similar quality. As a result, the capability of the fuel cell 10 is more likely to be stabilized.

Hereinafter, an example of using the fuel cell 10 according to the present embodiment will be described. If the fuel cell 10 mounted on a fuel cell vehicle exhibits degraded capability during operation, the plurality of unit cells 30 in the fuel cell 10 have to be examined one by one to specify the defective fuel cell 30. For example, if the fuel cell 10 can no longer output a desired voltage, the unit cell 30 having a reduced output voltage is specified. The barcode 41 provided on the exposed side surface of the separator 38 of the specified unit cell 30 is optically read with the barcode reader 52. The information relating to that unit cell 30 is then verified on the display of the database computer 50. By repeatedly conducting such data collection, information such as initial output characteristics and initial charging/discharging characteristics, materials and manufacturing conditions of the solid electrolyte membrane 31 and the gas diffusion electrodes 34, 35, and record of the past maintenance can be obtained for the unit cells 30 that are susceptible to degradation in capability. Moreover, the information relating to the unit cells 30 capable of maintaining their satisfactory capability can be obtained similarly.

As has been specifically described above, according to the embodiment, the barcode 41 is accessible from the exposed side surface of the separator 38 of the unit cell 30. This allows the information to be easily read without decomposing the unit cell 30. Moreover, the information of the unit cell 30 is known from the barcode 41. Therefore, information that cannot be determined by the outer appearance can be obtained, resulting in improving the service operation. Moreover, the conditions of the unit cells 30 (such as initial output characteristics and initial charging/discharging characteristics, and materials and manufacturing conditions) which are preferable to maintain satisfactory capability of the fuel cell 10 can also be known. As a result, before the defective unit cell 30 is replaced with a new one, whether the new unit cell 30 will function properly after replacement or not can be determined based on the information relating to the new unit cell 30 obtained from the barcode 41.

Figure 5A:
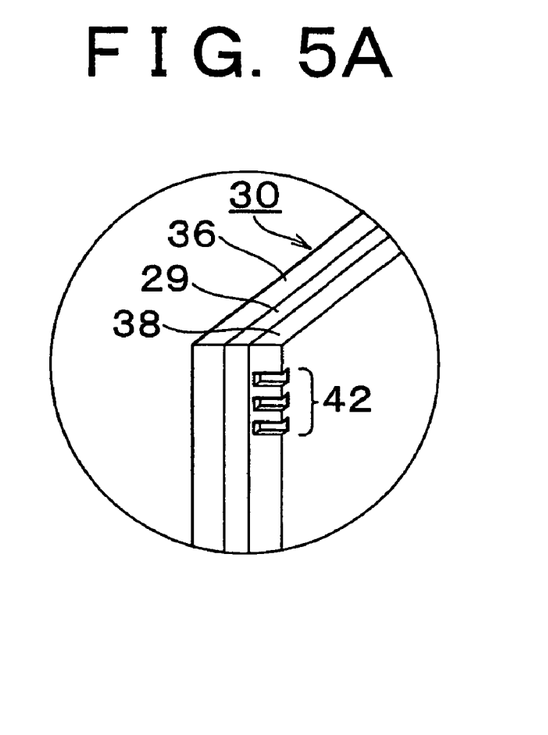
FIGS. 5A, 5B, 5C and 5D illustrate respective modifications of the first embodiment.
Figure 5B:
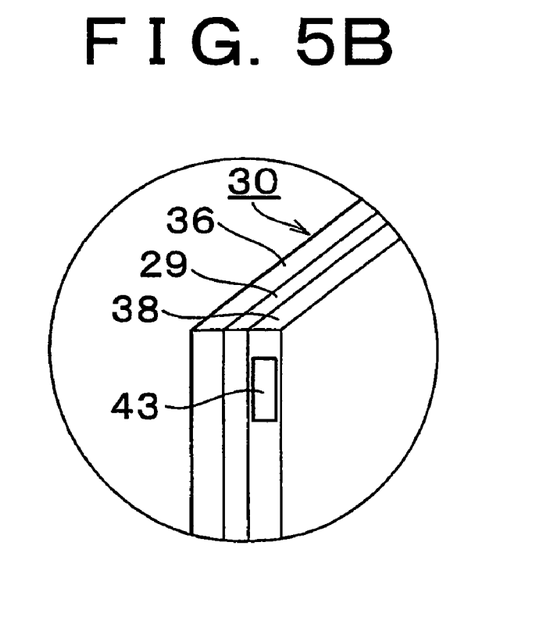
Figure 5C:
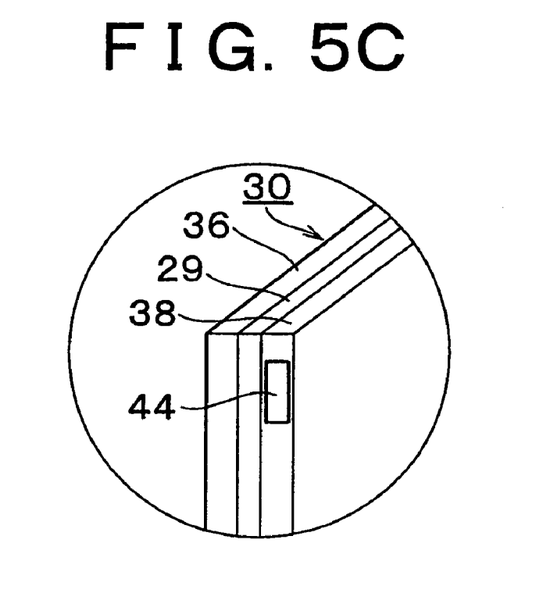
Figure 5D:
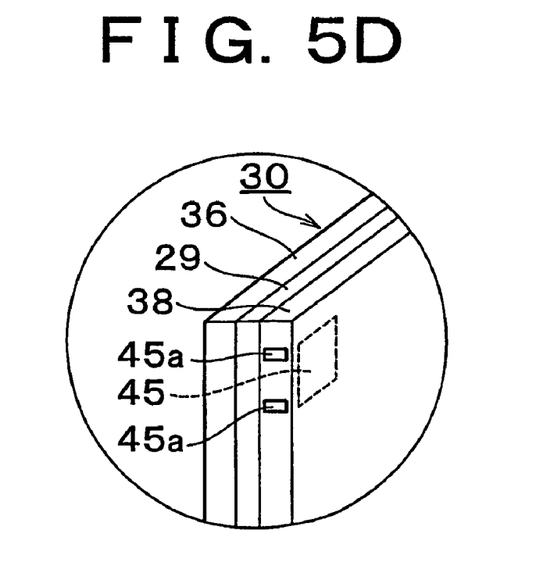

Note that, in the above embodiment, the barcode 41 is provided on the side surface of the separator 38. As shown in FIG. 5A, however, the barcode 41 may be replaced with optically or mechanically readable concave portion 42 forming a prescribed pattern corresponding to a code number. Alternatively, as shown in FIG. 5B, a magnetically readable tape, that is, a magnetic tape 43, that stores code numbers may be provided. Referring to FIG. 5C, an electrically readable IC chip 44 that stores code numbers may be provided on the side surface of the separator 38. Referring to FIG. 5D, an IC chip 45 that stores code numbers may be embedded in the separator 38 and electrodes 45a of the IC chip 45 may be exposed from the side surface of the separator 38. In this case, the IC chip 45 is embedded in a portion of the separator 45 that does not interfere with the fuel gas passage 37 and the oxidizing gas passage 39. Each of the aforementioned cases provides the same effects as those of the embodiment of the invention.

The magnetic tape 43 and the IC chips 44, 45 shown in FIGS. 5B to 5D may directly store the information relating to the unit cell 30 instead of the code numbers correlated to the information. This makes it possible to obtain the information related to the unit cell 30 by reading stored data with no need of the data retrieval.

In the above embodiment, the barcode 41 is provided on each of the unit cells 30. However, the barcode 41 may be provided on each of the cell lamination 11. In this case, the barcode 41 may be provided on the exposed surface of an any portion of the cell lamination 11 (e.g., the side surface of any one of the separators of the plurality of unit cells 30 included in the cell lamination 11, or the side surface of the insulator 14 or the end plate 16 of the fuel cell 10). The barcode 41 may be correlated to the information relating to a plurality of unit cells 30 of the cell lamination 11, or the information relating to the cell lamination 11, for example, initial output characteristics and initial charging/discharging characteristics.

The cell lamination 11 may be formed from a plurality of modules formed by laminating a predetermined number of the unit cells 30, that is, a plurality of cell modules (see Japanese Patent Laid-Open Publication No. 9-92324). In this case, the barcode 41 may be provided on each of the cell modules. More specifically, the barcode 41 may be provided on the exposed surface of each cell module (e.g., the side surface of any one of the separators of the plurality of unit cells 30 of each cell module). The barcode 41 may be correlated to the information relating to the plurality of unit cells 30 that constitute the cell module, or to the information relating to the cell module (for example, initial output characteristics and initial charging/discharging characteristics of the cell module).

Second Embodiment

Figure 6:
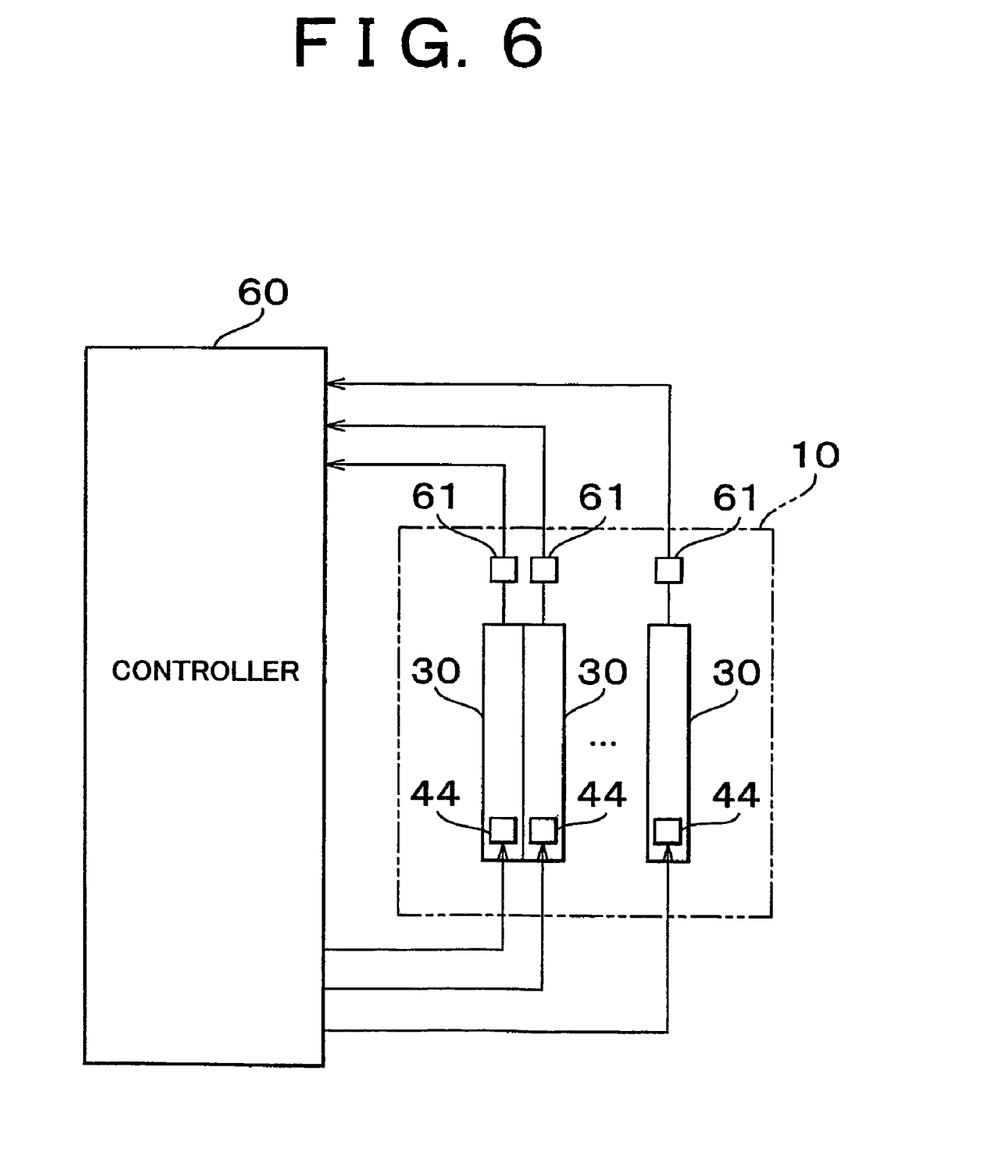
FIG. 6 shows the structure of a system used when a fuel cell of a second embodiment is mounted in a fuel cell vehicle.

The second embodiment is substantially the same as the first embodiment except that the barcode 41 is replaced with the IC chip 44 as shown in FIG. 5C. Therefore, only the difference between the first and second embodiments will be described hereinafter. FIG. 6 shows the structure of a system applied to a fuel cell vehicle on which the fuel cell of the second embodiment is mounted. Referring to FIG. 6, the IC chips 44 are connected to a controller 60 mounted on the fuel cell vehicle. The controller 60 is connected to sensors 61 for measuring the output voltage of the respective unit cells 30. The controller 60 reads the respective output voltages of the unit cells 30 from the sensors 61 at prescribed intervals, and writes them in the corresponding IC chips 44. As a result, change in the output voltage with time, that is, functional behavior of the unit cell during running of the vehicle is stored in the IC chips 44.

In the case where the fuel cell 10 mounted on the fuel cell vehicle fails to generate a desired voltage as elapse of time, the fuel cell 10 is detached from the vehicle in order to read the data contained in the IC chip 44 provided on the exposed side surface of the separator 38 of each of the unit cell 30. As a result, it can be determined as to which unit cell 30 has degraded performance.

According to the foregoing embodiment of the invention, each IC chip 44 is accessible from the exposed side surface of the separator 38 of the respective unit cell 30. This makes it possible to read the information easily without disassembling of the fuel cell 10. As the information that cannot be determined from the outer appearance may be obtained, the service operation can be further simplified. Moreover data on the functional behavior during running of the vehicle can be updated and accumulated. The data of the functional behavior may clarify the cause of either degraded performance or preferable performances of the unit cell 30. Moreover, the fuel cell 10 itself has the information relating to the unit cells 30. Therefore, performance of the unit cells 30 can be determined as well as causes of deteriorated or improved performance can be examined even if the fuel cell 10 is detached from the fuel cell vehicle.

In the embodiment, the controller 60 is designed to read data from the IC chip 44 of each fuel cell 30 as necessary during running of the fuel cell vehicle so as to perform driving control of the fuel cell vehicle or charging/discharging control of the fuel cell 10 on the basis of the read data. In the case where the fuel cell 10 is disassembled from the fuel cell vehicle for maintenance, and then assembled in the same or the different fuel cell vehicle, the output characteristics and the charging/discharging characteristics at the maintenance are stored in the IC chip 44. Accordingly, the controller 60 reads the aforementioned data so as to perform the drive control in accordance with the output characteristics and to perform the charging/discharging characteristics in accordance with the charging/discharging characteristics.

In the foregoing embodiment, the IC chip 44 provided on the side surface of the separator 38 serves as the storage medium. However, the storage medium is not limited to the IC chip. As shown in FIG. 5D, the IC chip 45 that stores code numbers may be embedded in a portion of the separator 38, which does not interfere with the fuel gas passage 37 and the oxidizing gas passage 39. Then the electrodes 45a of the IC chip 45 are provided on the exposed side surface of the separator 38. The foregoing case may also provide the same effect as that of the embodiment of the invention.

In the aforementioned embodiment, the IC chip 44 is provided on each of the unit cells 30. However, the IC chip 44 may be provided on an arbitrary exposed surface of the cell lamination 11. In this case, the IC chip 44 may be provided on the exposed surface of the cell lamination 11 (e.g., the side surface of any one of the separators of the plurality of unit cells 30 included in the cell lamination 11, or the side surface of the insulator 14 or the end plate 16 of the fuel cell 10). The IC chip 44 may store the information relating to a plurality of unit cells 30 included in the cell lamination 11, or the information relating to the cell lamination 11 (such as output characteristics and charging/discharging characteristics of the cell lamination 11).

The cell lamination 11 may be formed by laminating a predetermined number of stacked unit cells 30, i.e., a plurality of cell modules (see Japanese Patent Laid-Open Publication No. 9-92324). In this case, the IC chip 44 may be provided on each of the cell modules. More specifically, the IC chip 44 may be provided on the exposed surface of each of the cell modules (e.g., the side surface of any one of the separators of the plurality of unit cells 30 constituting the cell module). The IC chip 44 may store the information relating to the plurality of unit cells 30 included in the cell module, or the information relating to the cell module (such as output characteristics and charging/discharging characteristics of the cell modules).

In this embodiment, the side surface of each unit cell may have different number of concave portions representative of the capacity of the unit cell such that each capacity of the respective unit cells can be identified. The different type of the unit cell may also be distinguished from those combined together by the number of concave portions. Alternatively the outer surface of the unit cell may be differently colored in accordance with the capacity.

While the invention has been described in detail in terms of embodiments, it is apparent to those skilled in the art that the invention as disclosed herein is by way of illustration and example only and is not to be taken by way of limitation, and may be embodied in various forms without departing from the technical scope of the invention.

A fuel cell (10) includes a lamination (11) of a plurality of unit cells (30), current collector plates (12, 12) arranged at both ends of the lamination (11), end plates 16, 16 respectively provided outside the current collector plates (12, 12) with insulating plates (14, 14) interposed therebetween, and fastening members (18) for fastening the end plates (16, 16) in the laminating direction to apply desired pressing force to the lamination (11). A barcode (41) corresponding to particular information relating to a unit cell (30) is provided on the exposed side surface of a separator (38) of the unit cell (30). According to this fuel cell (10), the barcode 41 can be easily read requiring no disassembly of the fuel cell (10). Moreover, as the information relating to the fuel cell can be obtained from the barcode (41), the information that cannot be determined from outer appearance can be obtained, resulting in improved service operations.

The invention claimed is:

1. A fuel cell assembly, comprising:
   a plurality of unit cells, each of which is formed by interposing a solid electrolyte membrane between separators, which are laminated and fastened,
   at least one sensor which measures an output voltage of a unit cell, and
   a retrieval code containing particular information relating to a unit cell and being directly attached to and located on an exposed surface of at least one of the separators so as to be accessible from outside of the fuel cell, the particular information including accumulated measurement of the output voltage by the sensor and being updated with each measurement of the output voltage by the sensor
   wherein the retrieval code comprises an integrated circuit chip.

2. A fuel cell assembly according to claim 1, wherein each retrieval code comprises at least one of an optically readable code, a magnetically readable code, an electrically readable code, and a mechanically readable code.

3. A fuel cell assembly according to claim 1, wherein the particular information is provided by a specific information indicator that is correlated to the particular information relating to the unit cell, the specific information indicator being provided with each of the separators so as to be accessible from outside of the fuel cell.

4. A fuel cell assembly according to claim 1, wherein the particular information is provided by a specific information identifying element that is correlated to the particular information relating to the unit cell, the specific information identifying element being provided with each of the separators so as to be accessible from outside of the fuel cell.

5. A fuel cell assembly according to claim 1, wherein the particular information contains at least one of output characteristics, charging/discharging characteristics, past usage record, manufacturing record, maintenance record, and chronological change in behavior.

6. A fuel cell assembly according to claim 1, wherein the particular information is information which effects unit cell output performance.

7. A fuel cell assembly according to claim 1, wherein the particular information is updated or added at prescribed intervals during normal operation.

8. A fuel cell assembly, comprising:

a plurality of unit cells, each of which is formed by interposing a solid electrolyte membrane between separators, which are laminated and fastened; and a retrieval code containing particular information relating to the fuel cell is directly attached to and located on an exposed surface of at least one of the separators so as to be accessible from outside of the fuel cell, a retrieval code containing particular information relating to the fuel cell directly attached to and located on an exposed surface of at least one of the separators so as to be accessible from outside of the fuel cell, wherein the retrieval code comprises an integrated circuit chip and an electrode, the integrated circuit chip is embedded in a portion of at least one of the separators and the electrode is provided on the exposed surface of the at least one of the separators, and wherein the particular information is information which effects unit cell output performance.

9. A fuel cell assembly according to claim 8, wherein the particular information contains at least one of output characteristics, charging/discharging characteristics, past usage record, manufacturing record, maintenance record, and chronological change in behavior.

10. A hybrid vehicle equipped with the fuel cell assembly according to claim 8.

11. The hybrid vehicle according to claim 10, further comprising:

a controller that reads the measured output voltage from each sensor at prescribed intervals and writes the measured output voltage to each corresponding integrated circuit chip.

12. A hybrid vehicle equipped with the fuel cell assembly according to claim 1.

13. The hybrid vehicle according to claim 12, further comprising: a controller that reads the measured output voltage from each sensor and writes the measured output voltage to each corresponding retrieval code.

* * * * *

UNITED STATES PATENT AND TRADEMARK OFFICE
CERTIFICATE OF CORRECTION

PATENT NO. : 7,754,358 B2  
APPLICATION NO. : 10/485471  
DATED : July 13, 2010  
INVENTOR(S) : Toshiyuki Inagaki et al.

Page 1 of 1

It is certified that error appears in the above-identified patent and that said Letters Patent is hereby corrected as shown below:

In the Title Page: Change the information under

Item "(30)   Foreign Application Priority Data"

to read as follows:

--Aug. 1, 2001   (JP) ............2001-233250

Jul. 19, 2002   (JP) ............2002-211374--.

Signed and Sealed this

Twenty-fifth Day of January, 2011

David J. Kappos  
*Director of the United States Patent and Trademark Office*